US010311070B2

(12) United States Patent
Griesmeyer (10) Patent No.: US 10,311,070 B2
(45) Date of Patent: Jun. 4, 2019

(54) CANDIDATE TOPIC PICKER FOR DIGITAL MAGAZINE

(71) Applicant: Flipboard, Inc., Palo Alto, CA (US)

(72) Inventor: Robert Griesmeyer, San Francisco, CA (US)

(73) Assignee: Flipboard, Inc., Palo Alto, CA (US)

(*) Notice: Subject to any disclaimer, the term of this patent is extended or adjusted under 35 U.S.C. 154(b) by 291 days.

(21) Appl. No.: 15/242,088

(22) Filed: Aug. 19, 2016

(65) Prior Publication Data
US 2018/0052852 A1 Feb. 22, 2018

(51) Int. Cl.
G06F 7/02 (2006.01)
G06F 16/00 (2019.01)
G06F 16/2457 (2019.01)
G06F 16/95 (2019.01)
G06F 16/248 (2019.01)
G06F 8/00 (2018.01)
G06F 8/61 (2018.01)

(52) U.S. Cl.
CPC .......... *G06F 16/24578* (2019.01); *G06F 8/00* (2013.01); *G06F 8/61* (2013.01); *G06F 16/248* (2019.01); *G06F 16/95* (2019.01)

(58) Field of Classification Search
CPC ............... G06F 17/246; G06F 3/0482; G06F 17/30554; G06F 16/248; G06F 17/3053; G06F 16/24578; G06F 17/30861; G06F 16/95; G06F 17/30867; G06F 16/9535
See application file for complete search history.

(56) References Cited

U.S. PATENT DOCUMENTS

| | | | |
|---|---|---|---|
| 8,812,960 B1* | 8/2014 | Sun .................... | H04L 61/6077 715/757 |
| 9,942,690 B2* | 4/2018 | Gao ..................... | G06F 9/4843 |
| 2013/0159867 A1* | 6/2013 | Nuggehalli ........... | G06Q 30/02 715/738 |
| 2016/0034437 A1* | 2/2016 | Yong .................. | G06Q 30/0241 715/202 |
| 2016/0217206 A1* | 7/2016 | Mukaiyama ...... | G06F 17/30867 |
| 2017/0353565 A1* | 12/2017 | Kumar .................. | H04L 67/22 |

* cited by examiner

*Primary Examiner* — Bruce M Moser
(74) *Attorney, Agent, or Firm* — Fenwick & West LLP (57) ABSTRACT

A system generates and displays to a user of a digital magazine a list of candidate topics. The system first receives a package name list from a user device of the user, and the package name list indicates computer applications installed on the user device. The system retrieves a package name-topic matrix generated based on information associated with a set of existing users of the system. The system compares package names included in the received package name list and package names included in the package name-topic matrix, and identifies known topics in the package name-topic matrix based on the comparison. The system generates a list of candidate topics for the user based on the identified known topics, and provides the list for display to the user. In response to candidate topics selected by the user, the system provides to the user content relevant to the selected candidate topics.

20 Claims, 6 Drawing Sheets

User-package name matrix
370

User dimension 372 / Package name dimension 374

|     | P_1  | P_2  | P_3  |
|-----|------|------|------|
| U_1 | 0.67 | 0.23 | 0    |
| U_2 | 0.9  | 0    | 0.3  |
| U_3 | 0.8  | 0.3  | 0.02 |

User-package name matrix
380

User dimension 382 / Topic dimension 384

|     | T_1  | T_2  | T_3  |
|-----|------|------|------|
| U_1 | 0.5  | 0.78 | 0.1  |
| U_2 | 0.95 | 0.01 | 0.4  |
| U_3 | 0.1  | 0.3  | 0.85 |

Package name-topic matrix
390

Package name dimension 392 / Topic dimension 394

|     | T_1  | T_2  | T_3  |
|-----|------|------|------|
| P_1 | 1.27 | 0.77 | 1.11 |
| P_2 | 0.16 | 0.27 | 0.28 |
| P_3 | 0.29 | 0.01 | 0.14 |

CANDIDATE TOPIC PICKER FOR DIGITAL MAGAZINE

BACKGROUND

This disclosure relates generally to online content distribution, and more specifically to generating lists of candidate topics for recommendation to users of digital magazines in view of correlation between computer applications installed on user devices associated with the users of the digital magazines and known topics for the users.

Digital distribution channels disseminate to users a wide variety of digital content including videos, text, images, audio, links, and interactive media (e.g., games, collaborative content) from external or internal sources. A user of a digital magazine mobile application can enjoy different kinds of content (e.g., text articles, image files, audio files or video files) that are displayed on the digital magazine. Different users of digital magazines may have different preferences or personal interest and may expect to view content on the digital magazines that is more related to their own preferences. For example, one group of users of digital magazines may expect to view content of sports since they are sports lovers, and another group of users of digital magazines may expect to view content of newly released movies since these users are movie lovers. However, some existing solutions of digital magazines make different users to consume same or similar content instead of recommending personalized content that correspond to different users' preferences. Additionally, recommendation of content to different groups of users of digital magazines may not be accurate without considering and analyzing across a large user database of digital magazines. Such limitations degrade user experience with digital magazines.

SUMMARY

Embodiments of the disclosed invention include a system (or a computer implemented method or a non-transitory computer readable medium) for generating and displaying for recommendation to a user of a digital magazine a topic list of candidate topics, where the list includes one or candidate topics selected based on correlation between computer applications installed on user devices of a set of existing users of the system and known topics for the set of existing users. In one embodiment, the correlation between the computer applications installed on the user devices of the set of existing users of the system and known topics for the set of existing users is derived from a user-package name matrix, a user-topic matrix, and a package name-topic matrix associated with the set of users and the known topics for the set of users. The user-package name matrix describes correlation information between the computer applications installed in the user devices of the set of existing users. The user-topic matrix reflects whether the existing users are interested in some known topics or how relevant that known topics are to the set of users. The package name-topic matrix is generated based on information associated with the set of existing users. The package name-topic matrix describes correlation between computer applications installed on the user devices of the set of existing users and known topics that are likely of interest to the set of existing users.

In response to a user interacting with the digital magazine, a package name list of installed computer applications on a user device of the user is requested and received. Package names from the received package name list of the user are compared with package names included in the package name-topic matrix. Known topics included in the package name-topic matrix are identified based on the comparison. A list of candidate topics for the user is generated based on the identified known topics and is provided for display to the user. After the user selects candidate topics from the list, the selected candidate topics from the user are received, and content relevant to selected candidate topics are provided for display to the user.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION OF THE FIGURES

Example Digital Magazine System Environment

One embodiment of a disclosed configuration is a system (or a computer implemented method or a non-transitory computer readable medium) for generating lists of candidate topics for recommendation to a user of a digital magazine based on correlation between applications (e.g., mobile applications) installed on user devices (e.g., mobile phones) of a set of existing users of a digital magazine server and known topics for the set of existing users. A topic list of candidate topics for the user includes candidate topics matching preferences and personal interest of the user, and allows the user to select candidate topics from the topic list of candidate topics and further to receive relevant content of the selected topics. To generate the topic list of candidate topics for the user, a user-package name matrix, a user-topic matrix, and a package name-topic matrix are used based on the correlation between applications installed on user devices of the set of existing users of the digital magazine server and known topics for the set of existing users.

A "digital magazine" herein refers to an aggregation of digital content items that can be presented to users in a presentable format similar to the format used by print magazines. A "content item" herein refers to any machine-readable and machine-storable work product, such as textual articles, pictures/images, videos, user-generated content (e.g., content posted on a social networking system), advertisements, and any other types of digital content capable of display within the context of a digital magazine. In one embodiment, a digital magazine assembles a list of universal resource locators (URLs), where each video, image or textual article of the digital magazine is based on the content of a resource on the Internet to which a URL of the list of the URLs references to. A topic list of candidate topics generated for a user herein refers to a list of candidate topics that are tailored to the user, e.g., matching the user's preferences and personal interest, which is recommended to the user for selecting candidate topics that the user is mostly interested in and for receiving content on the selected candidate topics.

A "user-package name matrix" herein refers to a two-dimensional (2D) matrix with one dimension being the set of users and the other dimension being the package names of applications such as mobile applications or native applications that run on a mobile device (other than the mobile digital magazine application) installed on the user devices of the set of users such as mobile phones of the set of users, and entries of the user-package name matrix describe correlation information between the applications installed in the user devices and the set of users. A "package name" herein refers to a computer application or a type of application installed in the user devices of the set of users, and may include other metadata about the application (e.g., installation time, version).

A "user-topic matrix" herein refers to a 2D matrix with one dimension being the set of users and the other dimension being known topics for the set of users. For example, for a particular user of the set of users, the user-topic matrix reflects whether that user is interested in a specific topic or how relevant that topic is to that user. A "known topic" herein refers to a topic that is determined to be of interest to one or more users among the set of users. In one embodiment, the known topics for the set of users are learned or derived from articles interacted by the set of users, e.g., viewed, commented, liked or shared by the set of users. The known topics for the set of users are stored in a database of the digital magazine server.

A "package name-topic matrix" herein refers to a 2D matrix with one dimension being package names of installed computer applications and the other dimension being known topics for the set of the users, and entries of the package name-topic matrix reflect correlated information between the package names and the known topics for the set of users. The package names and the known topics in the package name-topic matrix are retrieved from the user-package name matrix and the user-topic matrix, and the package-name-topic matrix is derived from the user-package name matrix and the user-topic matrix. The digital magazine server 120 ranks the known topics based on the correlation between the installed applications and the known topics for the set of users.

At run time, a user of a digital magazine is requested by the digital magazine server 120 to provide a list of computer applications installed on the user's user device. The list of installed applications is analyzed in view of the user-package name matrix stored in a database of the digital magazine server 120 to retrieve the associated known topics and their corresponding ranking. Based on the ranking of the known topics, the digital magazine server 120 provides a list of candidate topics for the user for selection. Responsive to the user selection of one or more candidate topics, the digital magazine server 120 selects relevant content items of the selected candidate topics for presentation to the user.

Figure 1:
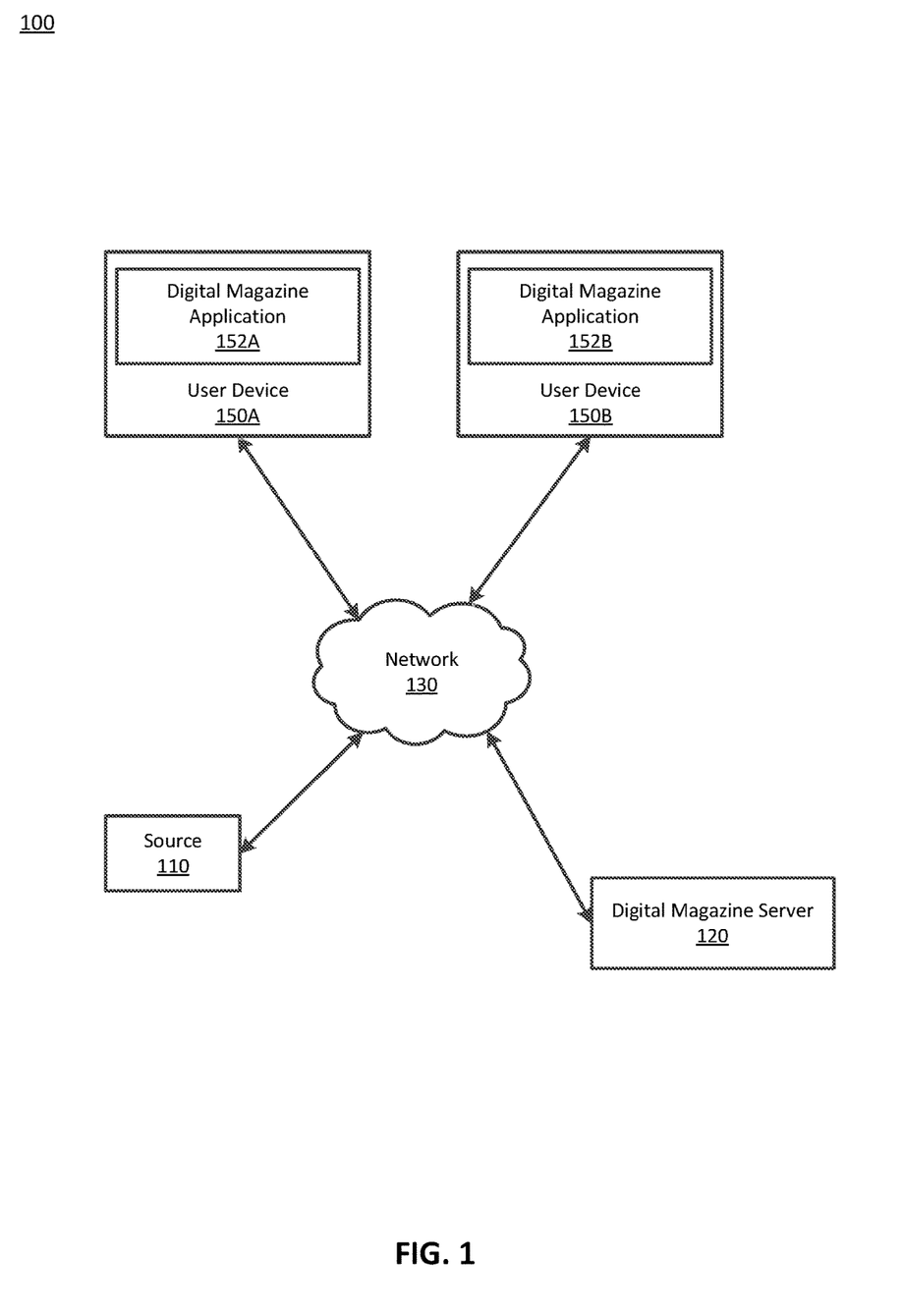
FIG. 1 is a block diagram of a system environment for generating a topic list of candidate topics for recommendation to a user of a digital magazine, according to one embodiment.

FIG. 1 is a block diagram of a system environment 100 for generating a topic list of candidate topics for recommendation to a user of a digital magazine, according to one embodiment. The system environment 100 shown in FIG. 1 includes one or more user devices 150 such as mobile phones of users (also interchangeably referred to as "client devices"), a source 110, a digital magazine server 120 and a network 130. Only two user devices 150, one source 110 and one digital magazine server 120 are shown in FIG. 1 to simplify the description. Other embodiments of the system environment 100 can have multiple user devices 150, sources 110 and digital magazine servers 120 connected through the network 130. Additionally, the functions performed by various entities of FIG. 1 may differ in different embodiments. The embodiments described herein can be adapted to online systems that are not digital magazine servers 120.

A source 110 is a computing system capable of providing various types of digital content to a user device 150 and to a digital magazine server 120. Examples of content provided by a source 110 include text, images, video or audio on web pages, web feeds, social networking information, messages or other suitable digital data. Additional examples of content include user-generated content such as blogs, tweets, shared images, audios or videos, social networking posts and social networking status updates. Content provided by a source 110 may be received from a publisher and distributed by the source 110; alternatively, a source 110 may be the publisher that generates content. For convenience, content from a source 110, regardless of its composition, is referred to herein as a "content item". A content item may include various types of content elements such as text, image, audio, video, interactive media, links and a combination thereof.

The digital magazine server 120 is a computer system that receives content items from one or more sources 110 or provided by users of the digital magazine server 120, generates pages in a digital magazine by processing the received content, and provides the pages to the user device 150 or provides instructions to the user device 150 to generate pages in a digital magazine.

The digital magazine server 120 also generates a topic list of candidate topics for recommendation to a user of a digital magazine based on correlation between computer applications installed on user devices associated with a set of existing users of the digital magazines and known topics for the set of users. In one embodiment, the correlation is derived from a user-package name matrix, a user-topic matrix, and a package name-topic matrix associated with the set of users and the known topics for the set of users. To generate the user-package name matrix for the set of users, for each of the set of users, the digital magazine sever 120 sends requests to a corresponding user device 150 for a package name list of installed computer applications on that user device, and receives the package name list from the user device. The digital magazine server 120 creates a user-package name matrix that correlates the set of users and package names (installed applications) in the received package name lists from user devices 150 of the set of users.

To generate the user-topic matrix, the digital magazine server 120 determines known topics that are likely of interest of to the set of users in a variety of ways. In one embodiment, the digital magazine server 120 records history of user interactions with the digital magazine displayed on the user device 150 to analyze content and topics that the user may be interested in. For example, the digital magazine server 120 retrieves reading history of textual articles and watching history of video files by the user of the user device 150, and determines possible topics the user may be interested in based on the retrieved history. The digital magazine server 120 also has a database storing all the retrieved and analyzed information as described above, and identifies known topics for the set of users. The digital magazine server 120 assembles the determined known topics associated with the set of users and creates the user-topic matrix.

The digital magazine server 120 further creates a package name-topic matrix based on the created user-topic matrix and user-package name matrix associated with a set of existing users of the digital magazine server 120 and the known topics for the set of existing users. In one embodiment, the digital magazine server 120 ranks known topics associated with the set of existing users based on the correlation between the installed computer applications and the known topics, which is explained further with references to FIG. 2 and FIGS. 3A-3B. From the generated package name-topic matrix, the digital magazine server 120 generates, for a particular user, a topic list of candidate topics of topics by analyzing a list of computer application installed on that user's user device and provides the list to the user. The digital magazine server 120 also allowing the user to select candidate topics in the topic list of candidate topics, and retrieves content relevant to the selected topics for presentation to the user.

The source 110, the digital magazine server 120 and the one or more user devices 150 communicate with each other via the network 130. The network 130 may comprise any combination of local area and/or wide area networks, using both wired and/or wireless communication systems. In one embodiment, the network 130 uses standard communications technologies and/or protocols. For example, the network 130 includes communication links using technologies such as Ethernet, 802.1, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communication links of the network 130 may be encrypted using any suitable technique or techniques.

The user device 150 is a computing device capable of receiving user input as well as transmitting and/or receiving digital data from the source 110 or the digital magazine server 120 via the network 130. Various embodiments of the user device 150 include a conventional computer system, such as a desktop or a laptop computer, and a device having computer functionality, such as a personal digital assistant (PDA), a mobile telephone, a smartphone or another suitable device.

In one embodiment, each of the user devices 150 further includes a wireless digital magazine application 152 executed on the user device 150 that presents content to the user and allows the user to access and to interact with the content presented via a digital magazine. The digital magazine application 152 on the user device 150 further enables its users to interact with the digital magazine server 120. For example, the digital magazine application 152 communicates instructions or requests for content items from user of the user device 150 to the digital magazine server 120. The user device 150 also executes a browser that receives pages from the digital magazine server 120 and presents the pages to a user accessing the user device.

As one example, the digital magazine application 152A instructed by the digital magazine server 120 requests a package name list of computer applications installed on the user device 150A, and provides the received package name list to the digital magazine server 120 for generating the personalized list of candidate topics. As another example, the digital magazine application 152A provides generated topic list of candidate topics to the user device 150A for the user to view and to select candidate topics he/she is most interested in, and presents relevant content received from the digital magazine sever 120 to the user.

Example Digital Magazine Server

Figure 2:
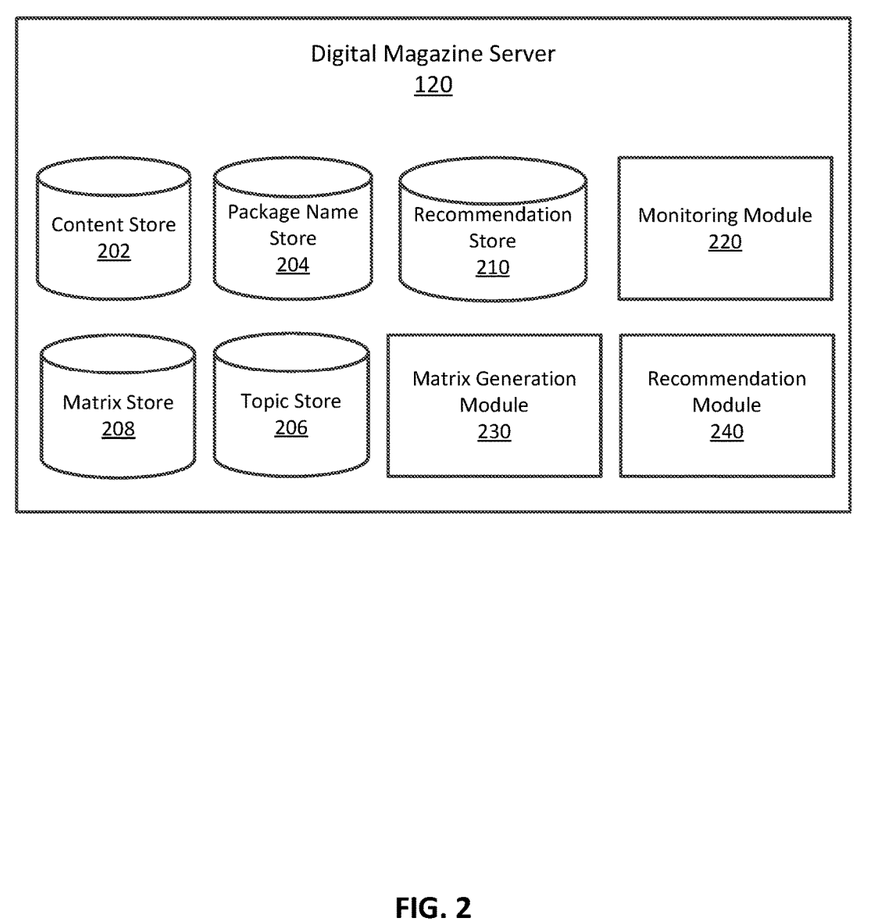
FIG. 2 is an example block diagram of the digital magazine server shown in FIG. 1, according to one embodiment.

FIG. 2 is an example block diagram of the digital magazine server 120 shown in FIG. 1, according to one embodiment. The digital magazine server 120 shown in FIG. 2 includes a content store 202, a package name store 204, a topic store 206, a matrix store 208, a recommendation store 210, a monitoring module 220, a matrix generation module 230 and a recommendation module 230. In alternative embodiments, the digital magazine server 120 may include additional, fewer, or different entities for various applications. Likewise, the functions performed by various entities of the digital magazine server 120 shown in FIG. 2 may differ in different embodiments.

The content store 202 stores objects that represent various types of digital content items, and the stored content items are used by the matrix generation module 230 to determine topics for a set of existing users of the digital magazine server 120, and to create a user-topic matrix associated with the set of users. In one embodiment, the objects are URLs, each of which references to a resource on the Internet. The content store 202 may also store content items referenced by the URLs. Examples of content items stored in the content store 204 include textual articles, page posts, status updates, images (e.g., photographs), video links, audios, check-in events at locations, or any other types of content. The content store 202 may store links (e.g., URLs) and/or referenced content items within a threshold time of a current time (e.g., 6 months). As one example, the content store 202 stores URLs that reference specific textual files and referenced textual files received from one or more sources 110.

The package name store 204 stores package name lists of computer applications installed on user devices of existing users of the digital magazine server 120. The stored package name lists are used by the matrix generation module 230 to determine package names associated with a set of different users and to create a user-package name matrix for the same set of users. As described above, a package name list of applications installed on a user device 150 has information about computer applications installed in the user device 150. In one embodiment, a package name represents a certain computer application or a certain type of applications installed in a user device 150. As one example, Instagram and Google Map are two different package names and two applications installed in the user device 150A, which represent different types of applications with one being a social networking photo sharing application and the other being navigation and location application. As another example, Google Map and Apple Map that both belong to the same type of applications, e.g., maps, can also be two different package names, or a single package name indicating the same type of application. Example information indicated by the package name may include application type, owner, manufacturer, version and other features.

In one embodiment, the package name store 204 stores package name lists received from user devices 150 associated with a set of existing users of the digital magazine server 120 and individual package names retrieved from the received package name lists. For example, the package names stored in the package name store 204 may include package names that are shared by all different users among the set of users from whom the package name lists are gathered, or package names that are shared only by a group of users among the set of users, or package names that represent applications that are associated with only a single user (e.g., only this single user installed applications associated with the package names).

The topic store 206 stores topics associated with users of the digital magazine server 120, and the topics stored in the topic store is used by the matrix generation module 230 to determine known topics for the users. The relationship between the known topics and their associated users is represented by a user-topic matrix, as more fully described below. In one embodiment, the topic store 206 stores individual topics associated with users of the digital magazine. In more detail, the known topics associated with a particular user among the set of existing users of the digital magazine server 120 refers to topics that match preferences or personal interest of that user. As one example, "vegetarian" and "sports" may be two example known topics for a user of a digital magazine, which are interested by the user, e.g., because this user may be a vegetarian and a sports lover. As described above, the topics associated with a user can be retrieved from the user's viewing history of content (e.g., textual articles, images, videos) in the digital magazine. In the same example shown above, the user may read many articles about recipes or dishes for vegetarians and news about sports stars that are displayed on the digital magazine, and information from the viewing history is retrieved and topics like "vegetarian" and "sports" are determined to be associated with the user.

The matrix store 208 stores the user-topic matrix, the user-package name matrix, and the package name-topic matrix created by the matrix generation module 230. The stored package name-topic matrix is used by the recommendation module 240 to generate a topic list of candidate topics for recommendation to users of digital magazines. Examples of the user-topic matrix, the user-package name matrix, and the package name-topic matrix are further described below with reference to FIG. 3A and FIG. 3B.

The monitoring module 220 monitors communications between the user device 150 and the digital magazine server 120 as well as user interactions between the user and the digital magazine server 120. In more detail, the monitoring module 220 receives package name lists from user devices 150 associated with users of the digital magazine server 120, and the received package name lists are stored in the package name store 204. The monitoring module 220 also provides lists of candidate topics for display to users of the user devices 150, e.g., providing to a user device a list of recommended candidate topics that are likely of interest to a user. With the list of recommended topics to the user, the monitoring module 220 also allows the user to select candidate topics from the topic list and provides to the user content relevant to the selected topics.

The matrix generation module 230 retrieves known topics for a set of existing users from the topic store 206 and package names associated with the set of existing users from the package name store 204, and generates a user-package name matrix, a user-topic matrix, and a package name-topic matrix that are associated with the set of existing users. The created matrices are stored in the matrix store 208. In one embodiment, the set of existing users can be all users registered in a user database of the digital magazine magazine 120, e.g., all users that have registered with the digital magazine server 120. In another embodiment, the set of users can be a group of users selected from the user database of the digital magazine server 120.

In one embodiment, to generate the user-topic matrix and the user-package name matrix, statistic models are used, for example, a term frequency-inverse document frequency (tf-idf) model. In other embodiments, other statistics models different from the tf-idf model may also be used to generate the user-topic matrix and the user-package name matrix. In the tf-idf model, the term frequency (tf) indicates number of times a term in a document, and the inverse document frequency (idf) is a measure of how common or rare a term is across all documents.

When applying the tf-idf model to generate the user-topic matrix, for a known topic, e.g., topic $T\_1$, for a user of the set of users (e.g., users $U\_1$), the matrix generation module 230 counts frequency of the known topic associated with that user to generate a term frequency for the user associated with the known topic. For example, by analyzing the viewing history of content in the digital magazine viewed by that user, the matrix generation module 230 determines how many times that topic showed up in the viewing history of the user, where more times the topic showed up in the user's viewing history, more relevant that topic is to the user, and a high frequency of the topic further indicates that the user is more interested in that topic.

The matrix generation module 230 further weights the term frequency of the known topic for that user, e.g., by applying an inverse document frequency weight to the term frequency of the topic to indicate how common or rare the topic is across all known topics (e.g., topics $T\_1$ to $T\_K$). In one embodiment, the matrix generation module 230 divides the total number of the known topics associated with that user by the number of that particular topic associated with the user, and takes the logarithm of that quotient to generate an inverse document frequency of that known topic with respect to the user. The matrix generation module 230 computes a tf-idf weight for the topic by multiplying the topic's term frequency by its corresponding inverse document frequency. The weight can be used to indicate how important that topic is to the user.

The matrix generation module 230 repeats the similar steps to calculate the tf-idf weight for each of the remaining known topics in the topic dimension for that user. For each of other users in the set included in the user dimension, the matrix generation module 230 applied the similar procedure to generate a corresponding tf-idf weight. Alternatively, the matrix generation module 230 may repeat the similar steps to calculate the tf-idf for all users in the user dimension of the matrix for a given known topic (e.g., topic $T\_1$), then computes the tf-idf for all the users for each of the remaining known topics on the topic dimension of the matrix.

In a similar way, the matrix generation module 230 creates the user-package name matrix using a tf-idf model. In more detail, the matrix generation module 230 determines a tf-idf weight for each package name on the package dimension of the matrix with respect to each of the users in the user dimension of the matrix. For example, the matrix generation module 230 determines a term frequency for a given package name (e.g., P_1) with respect to each of the users on the user dimension and inverse term frequency of the given package name with respect to each of the users and calculates the tf-idf for the given package name with respect to each user. The matrix generation module 230 repeats the same or similar steps to generate the tf-idf weight for the remaining package names for each of the users.

Based on the user-topic matrix and the user-package name matrix, the matrix generation module 230 generates a corresponding package name-topic matrix for the same set of users, known topics and the package names associated with the set of users. In more detail, based on the same set of users included in both user-topic matrix and the user-package name matrix, the matrix generation module 230 first transposes the user-package name matrix to render a package name-user matrix. The matrix generation module 230 then multiplies the package name-user matrix that is transposed from the user-package name matrix with the user-topic matrix to create the package name-topic matrix. In one embodiment, the matrix multiplication is a dot production, as more fully described above with reference to FIGS. 3A-3B. The information contained in the entries of the package name-topic matrix represents correlation between computer applications identified by the package names installed on the user devices of the set of existing users and known topics associate with the set of existing users.

Based on the correlation, the known topics described by the user-topic matrix and the user-package name matrix and package name-topic matrix can be ranked and the rankings of the known topics are stored in the digital magazine server 120, which is used to generate a list of candidate topics for a user in response to receiving a list of applications installed on a user device of the user. Generating a list of candidate topics for a user using the correlation between known topics and package names of installed applications is further described below.

Figure 3A:
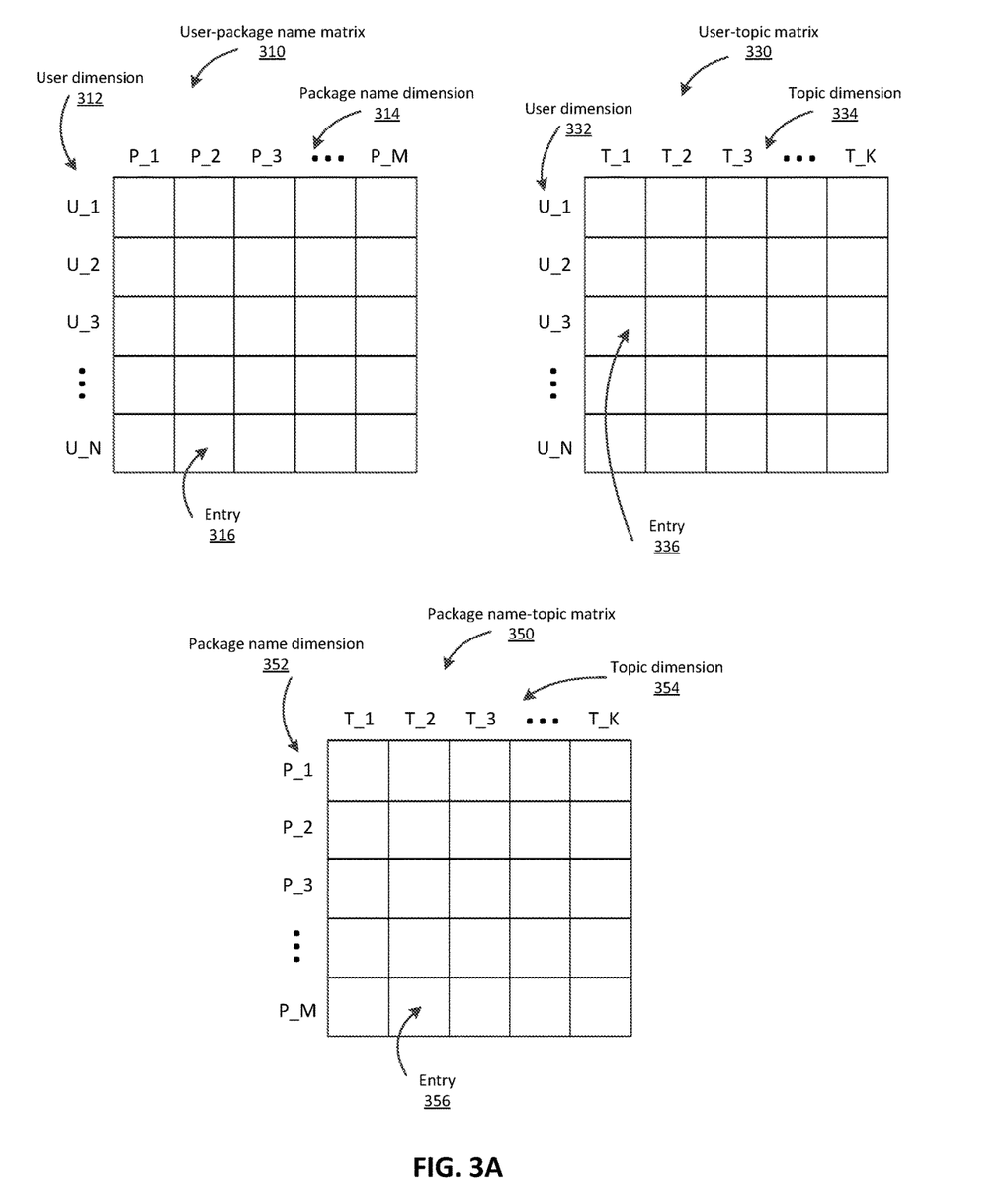
FIG. 3A shows an example user-package name matrix, an example user-package name matrix, and an example package name-topic matrix with the matrices filled with no values, according to one embodiment.

Turning now to FIG. 3A, FIG. 3A shows an example user-package name matrix 310, an example user-package name matrix 330, and an example package name-topic matrix 350 with the matrices filled with no values, according to one embodiment. In FIG. 3A, the user-package name matrix 310 includes a user dimension 312 (e.g., U_1 to U_N here) representing a total number of N existing users of the digital magazine server 120 and a package name dimension 314 (e.g., P_1 to P_M here) representing a total number of M applications installed on the user devices associated with the N existing users. Each entry, e.g., entry 316, of the matrix is associated with a corresponding user (e.g., U_N here) and a corresponding package name (e.g., P_2 here), and the value filled in the entry (not shown here) indicates how relevant that package name is to that user (e.g., whether the user has installed that application). The user-package name matric 310 may be a square matrix (e.g., N equals M), or a non-square matrix (e.g., N does not equal M).

Similarly, the user-topic matrix 330 includes a user dimension 332 (e.g., U_1 to U_N here) and a topic dimension 334 (e.g., T_1 to T_K here) representing a total number of K known topics associated with the N existing users. Each entry, e.g., entry 336, of the matrix 330 is associated with a corresponding user (e.g., U_3 here) and a corresponding known topic (e.g., T_1 here) associated with the user U_3, and the value filled in the entry (not shown here) indicates how relevant that known topic is to that user (e.g., whether the known topic is of interest of the user or matches the user's preferences based on whether the user has read any articles on the topic and/or how many articles on the topic were read by the user in the past). The user dimension 332 represents the same set of existing users as the one in the user dimension 312 of the user-package name matrix 310. The user-topic matrix 330 may be a square matrix (e.g., N equals K), or a non-square matrix (e.g., N does not equal K).

Figure 3B:
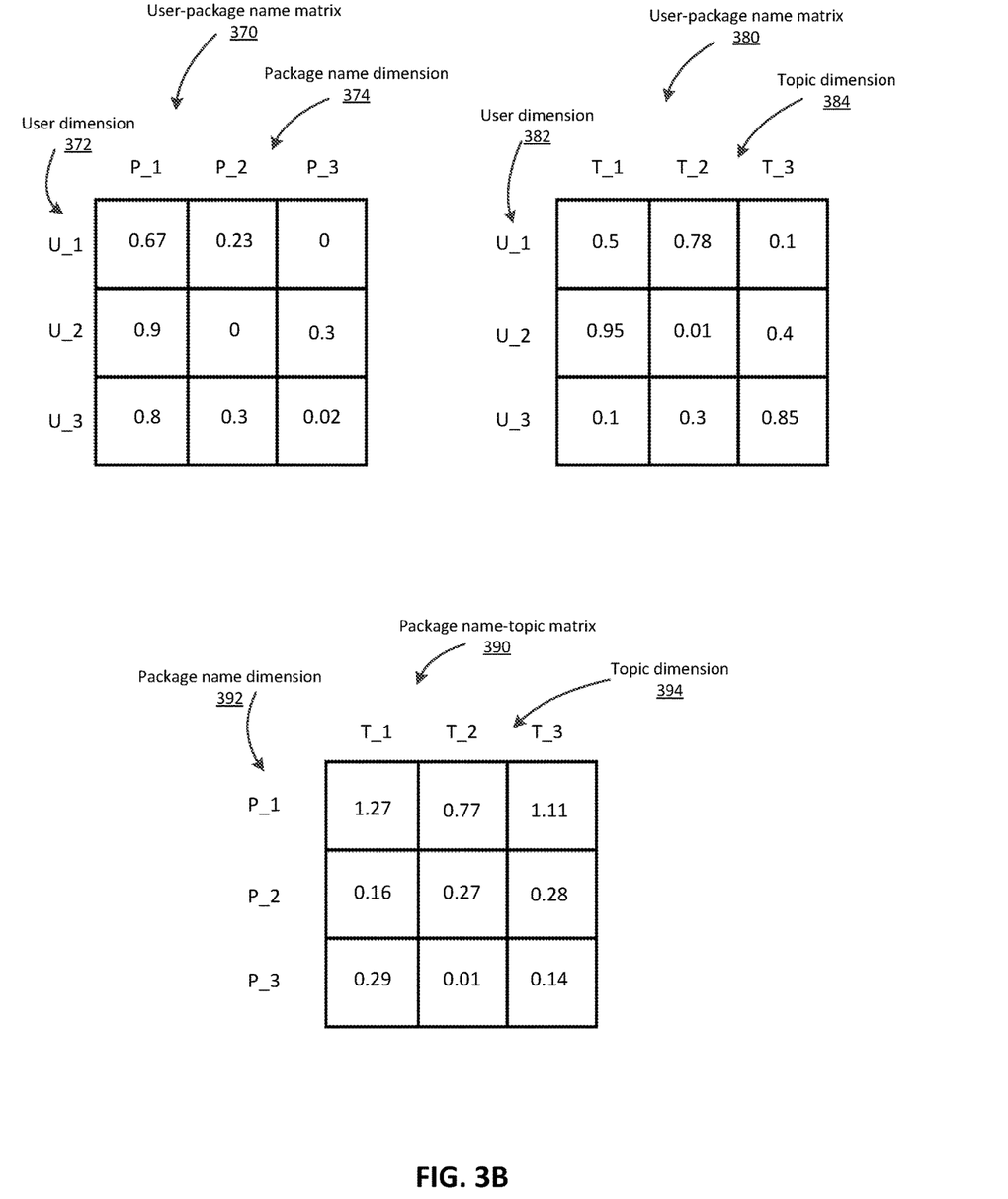
FIG. 3B shows an example user-package name matrix, an example user-package name matrix, and an example package name-topic matrix with the matrices filled with example values for illustration purpose, according to one embodiment.

The package name-topic matrix 350 includes a package name dimension 352 (e.g., P_1 to P_M here) and a topic dimension 354 (e.g., T_1 to T_K here), and each entry, e.g., entry 356, of the matrix is associated with a corresponding package name (e.g., P_M here) and a corresponding known topic (e.g., T_2 here). More specifically, each entry 356 of the matrix 352 is result of dot product between the corresponding entries in the transposed user-package name matrix 310 and the user-topic matrix 330. For example, the entry 356 that is associated with the package name P_M and with the topic T_2 is a result of the following mathematical calculation:

$$(P_M, U_1)*(U_1, T_2) + (P_M, U_2)*(U_2, T_2) + \ldots + (P_M, U_N)*(U_N, T_2),$$

where parameter set $(P_M, U_1)$ represents a correlation between user U_1 and package name P_M derived from the matrix 310 that is associated with P_M and with U_1, as more fully described below in FIG. 3B.

As shown in the calculation above, each entry in the matrix 350 represents a correlation between a corresponding package name (e.g., P_M here) and a corresponding topic (e.g., T_2 here) based on the set of existing users (e.g., U_1 to U_N here) and the known topics associated with the set of the existing users, and the value filled in the entry (not shown here) indicates how relevant or how prominent the topic is to the package name.

FIG. 3B shows an example user-package name matrix 370, an example user-package name matrix 380, and an example package name-topic matrix 390 with the matrices filled with example values for illustration purpose, according to one embodiment. In FIG. 3B, for purpose of illustration, the example user-package name matrix 370, the example user-topic matrix 380, and the according package name-topic matrix 390 are all 3 by 3 matrix. More specifically, the user-package name matrix 370 includes a user dimension 372 and a package name dimension 374, and each entry of the matrix is filled with an example value. For example, the entry (U_1, P_1) has a value of 0.67, which indicates the relevancy of a computer application identified by the package name P_1 to a user identified by the user ID U_1, the entry (U_1, P_2) has a value of 0.23, and the entry (U_1, P_3) has a value of 0. The values for entry (U_1, P_1) and entry (U_1, P_2) may indicate that to the specific user U_1, the installed application identified by package name P_1 is more relevant to the user, than the installed application identified by package name P_2, and the installed application identified by package name P_3 is not relevant to the user at all (e.g., not installed in the user device of the user).

The user-topic matrix 380 includes a user dimension 382 and a topic dimension 384, and each entry of the matrix 380 is filled with an example value. For example, the entry (U_2, T_1) has a value of 0.95, the entry (U_2, T_3) has a value of 0.4, and the entry (U_2, T_2) has a value of 0.01, which may indicate that to the specific user U_2, known topic T_1 is more relevant to the user (e.g., best matches the user's personal interest or preferences among the three known topics) than known topic T_3, but less relevant than known topic T_2.

The package name-topic matrix 390 includes a package name dimension 392 and a topic dimension 394, and each entry of the matrix 390 is filled with an example value. For example, the entry (P_1, T_1) has a value of 1.27, and the entry (P_2, T_3) has a value of 0.28. In more detail, based on the examples shown in FIG. 3B, the value of (P_2, T_3) is calculated as follows: 0.23*0.1+0*0.4+0.3*0.85=0.278, which is approximately 0.28.

As described above, each entry in the matrix 390 indicates a correlation between a corresponding package name and a corresponding known topic associated with the set of existing users (e.g., U_1 to U_3 here) of the digital magazine server 120, and a higher value indicates a higher correlation. The known topics (e.g., T_1, T_2 and T_3) can be ranked based on their correlation with respect to each package name described by the package name-topic matrix 390. The rankings of the known topics are stored in the digital magazine server 120 and retrieved for recommending candidate topics for a user at run time. For example, the corresponding topic with the highest correlation with an installed application identified by a packaging name may be selected as one candidate topic to recommend to the user who has installed the application that corresponds to the package name. Using FIG. 3B as an example, for an installed application identified by package name P_2, topics T_3 and T_2 can be recommend to a user who has installed such application on his/her user device.

Turning now back to FIG. 2, the recommendation store 210 stores lists of candidate topics for recommendation to users of the digital magazines provided by the digital magazine server 120, and the lists of candidate topics are generated by the recommendation module 230 and used by monitoring module 220 for display to the users. In one embodiment, a list of candidate topics for a user is a ranked list with the candidate topics being ranked based on the rankings associated with the candidate topics. The candidate topics included in the list for the user are selected from the known topics included in the package name-topic matrix based on the the list of applications installed on the user's user device.

The recommendation module 240 extracts the package name-topic matrix from the matrix store 208, and generates lists of candidate topics for users of digital magazines, and stores the generated lists of candidate topics in the recommendation store 210. In more detail, for a specific user of a digital magazine, the recommendation module 240 receives a list of applications installed on a user device of the user, e.g., a mobile phone of the user, and compares the package names identifying the installed applications with the entries in the package name-topic matrix. Based on the comparison, the recommendation module 240 identifies the matching package names and the known topics described by the package name-topic matrix that correspond to the matching package names, where each identified known topic is a candidate topic for the user. The recommendation module 240 retrieves the rankings associated with the identified known topics and generates a ranked list of candidate topics for the user.

Example Interactions Between the Digital Magazine Server and a Client Device

Figure 4:
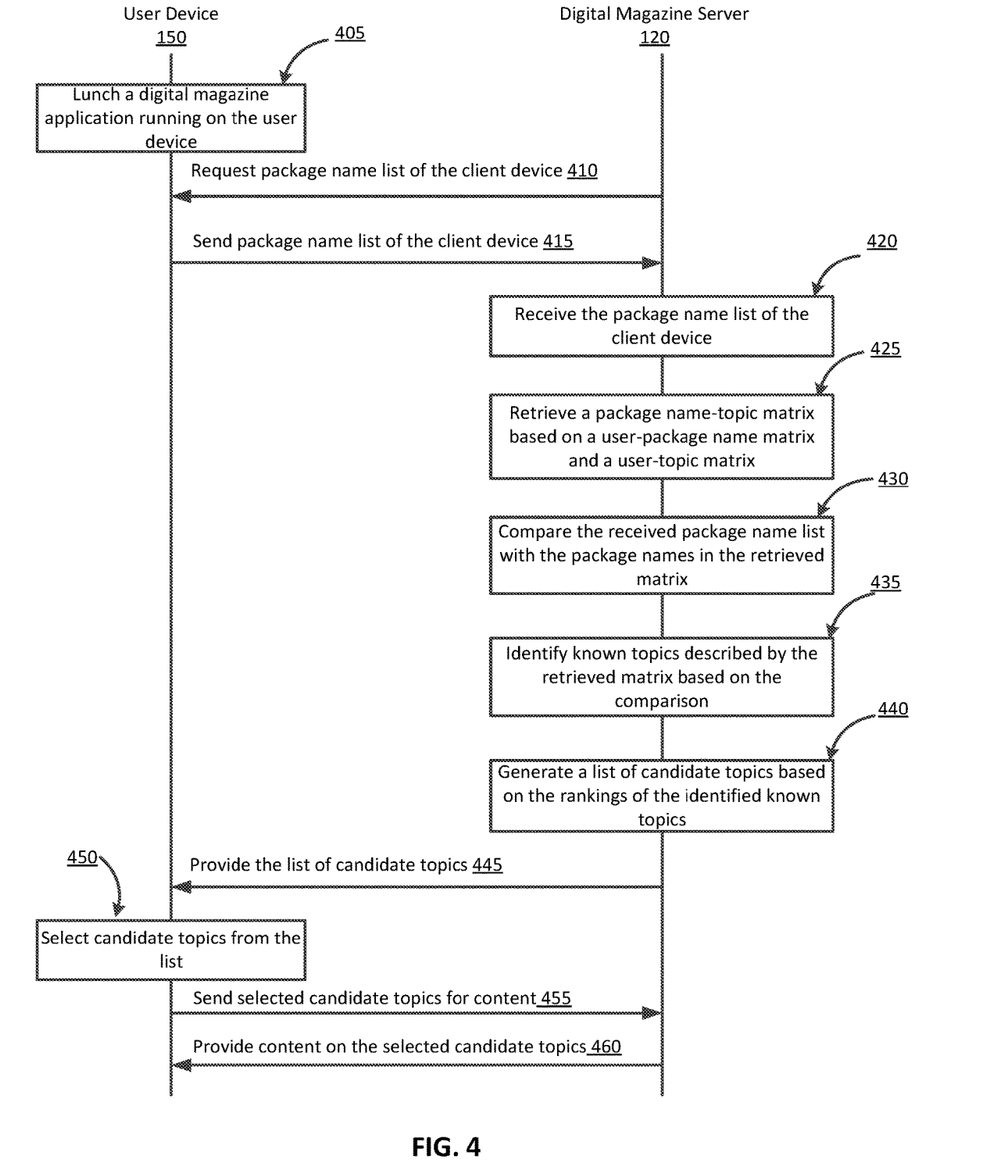
FIG. 4 shows interactions between the digital magazine server and a client device to generate a topic list of candidate topics for recommendation to a user of the digital magazine, according to one embodiment.

FIG. 4 shows example interactions between the digital magazine server 120 and a user device 150 of a user to generate a list of candidate topics for recommendation to the user of a digital magazine, according to one embodiment. Initially, the user of the client device 150 lunches 405 a digital magazine application executed in the user device 150. The digital magazine server 120 detects the user action with the digital magazine application and requests 410 a package name list of computer applications other than the digital magazine application installed on the client device 150, and the client device sends 415 the package name list of to the digital magazine server 120. As described above, the package name list indicates and includes information of the computer applications installed on the user device 150. After receiving 420 the package name list of the client device 150, the digital magazine server 120 retrieves 425 a package name-topic matrix, e.g., the package name-topic matrix 380 shown in FIG. 3B, which was created based on a user-package name matrix, e.g., the user-package name matrix 370 shown in FIG. 3B, and a user-topic matrix, e.g., the user-package name matrix 380 shown in FIG. 3B. The digital magazine server 120 compares 430 the package names on the received package name list from the user device 150 with the package names on the retrieved package name-topic matrix. Based on the comparison, the digital magazine server 120 identifies 435 known topics for matching package names and retrieves the rankings of the identified known topics. The digital magazine server 120 generates 440 a list of candidate topics based on the identified known topics and their associated rankings. The digital magazine server 120 provides 445 for display the list of candidate topics to the user of the user device 150. In one embodiment, the user of the user device 150 selects 450 one or more candidate topics from the list. The user device 150 also sends 455 the selected candidate topics back to the digital magazine server 120 for content selection. After receiving the selected candidate topics from the user device 150, the digital magazine server 120 selects content on the selected candidate topics and provides 460 for display to the user of the user device 150 the selected content.

Example Flowchart

Figure 5:
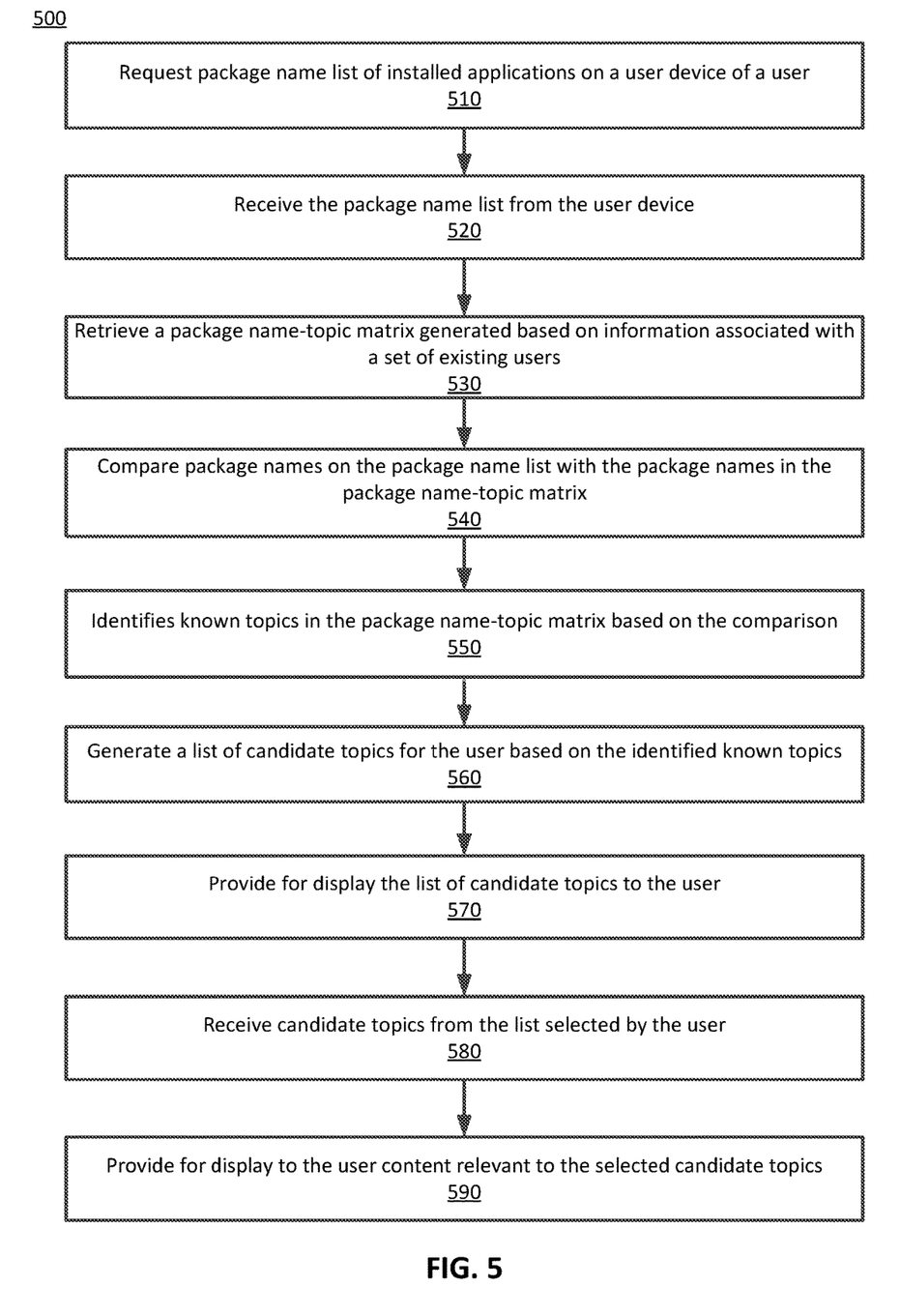
FIG. 5 shows a flowchart illustrating a process of generating a list of candidate topics for recommendation to a user of a digital magazine by the digital magazine server, according to one embodiment.

FIG. 5 shows a flowchart illustrating a process of generating a list of candidate topics for recommendation to a user of a digital magazine by the digital magazine server 120, according to one embodiment. The digital magazine server 120 first requests 510 a package name list of computer applications installed on a user device of the user, where a digital magazine application is executed on the user device, and receives 520 the package name list from the user device. The package name list provides information about the applications installed on the user device. The digital magazine server 120 retrieves 530 a package name-topic matrix generated based on information associated with a set of existing users of the digital magazine server 120, where the information associated with the set of existing users is described by a user-package name matrix and a user-topic matrix for the set of existing users. The digital magazine server 120 compares 540 the package names on the list received from the user device with the package names in the package name-topic matrix. Based on the comparison the digital magazine server 120 identifies 550 known topics included in the package name-topic matrix. The digital magazine server 120 generates 560 a list of candidate topics for the user based on the rankings of the identified known topics, and provides 570 for display the list of candidate topics to the user. The digital magazine server 120 receives 580 one or more candidate topics selected by the user from the list of candidate topics for the user, and provides 590 for display to the user content relevant to the selected candidate topics.

Additional Configuration Information

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method comprising:
   receiving a list of applications installed on a user device of a user, each application being identified by a package name;
   retrieving a package name-topic matrix representing correlations between a plurality of package names identifying a plurality of applications installed on user devices of a set of existing users and known topics associated with the set of existing users, wherein the package name-topic matrix is a two-dimensional matrix with one dimension representing the set of the existing users and the other dimension representing the known topics for the set of existing users, and each entry of the package name-topic matrix describes a correlation between a corresponding topic and a package name identifying an application installed on the user devices of the set of existing users;
   comparing the package names on the received list with the plurality of package names in the retrieved package name-topic matrix;
   identifying one or more known topics from the package name-topic matrix based on the comparison; and
   generating, for presentation to the user, a list of candidate topics based on the identified one or more known topics.

2. The computer-implemented method of claim 1, further comprising:
   sending to the user device of the user a request for the list of applications installed on the user device of the user;
   receiving one or more candidate topics selected by the user from the list of candidate topics;
   selecting content items on the selected candidate topics; and
   providing the selected content items for presentation to the user.

3. The computer-implemented method of claim 1, further comprising:
   ranking the identified known topics based on ranking information associated with each identified known topic; and
   generating the list of candidate topics based on the ranking.

4. The computer-implemented method of claim 3, wherein the ranking information associated with an identified known topic describes a level of correlation between the known topic and each package name identifying an application installed on the user devices of the set of existing users.

5. The computer-implemented method of claim 1, further comprising:
   retrieving a user-package name matrix and a user-topic matrix associated with the set of existing users and the plurality of applications installed on the user devices of the set of existing users; and
   generating the package name-topic matrix by multiplying a transpose of the user-package name matrix with the user-topic matrix.

6. The computer-implemented method of claim 5, wherein the user-package name matrix is a two-dimensional matrix with one dimension representing the set of the existing users and the other dimension representing the applications identified by the plurality of the package names.

7. The computer-implemented method of claim 6, wherein each entry of the user-package name matrix represents a correlation between a corresponding user and an application identified by a corresponding package name, the correlation indicating how relevant the application is to the user with respect to other computer applications.

8. The computer-implemented method of claim 7, wherein the correlation between a corresponding user and an application identified by a corresponding package name is represented by a numeric value generated by a trained term frequency and inverse document frequency statistic model based on user information of the set of existing users and information of the plurality of applications installed on the user devices of the set of existing users.

9. The computer-implemented method of claim 5, wherein the user-topic matrix is a two-dimensional matrix with one dimension representing the set of the existing users and the other dimension representing the known topics for the set of existing users.

10. The computer-implemented method of claim 9, wherein each entry of the user-topic matrix represents a correlation between a corresponding user and a corresponding known topic, the correlation indicating how relevant the known topic is to the user with respect to other known topics.

11. A non-transitory computer readable storage medium storing computer program instructions, the computer program instructions when executed by a computer processor causes the processor to perform the steps of:

receiving a list of applications installed on a user device of a user, each computer application being identified by a package name;

retrieving a package name-topic matrix representing correlations between a plurality of package names identifying a plurality of applications installed on user devices of a set of existing users and known topics associated with the set of existing users, wherein the package name-topic matrix is a two-dimensional matrix with one dimension representing the set of the existing users and the other dimension representing the known topics for the set of existing users, and each entry of the package name-topic matrix describes a correlation between a corresponding topic and a package name identifying an application installed on the user devices of the set of existing users;

comparing the package names on the received list with the plurality of package names in the retrieved package name-topic matrix;

identifying one or more known topics from the package name-topic matrix based on the comparison; and generating, for presentation to the user, a list of candidate topics based on the identified one or more known topics.

12. The non-transitory computer readable storage medium of claim 11, further comprising:

sending to the user device of the user a request for the list of applications installed on the user device of the user;

receiving one or more candidate topics selected by the user from the list of candidate topics;

selecting content items on the selected candidate topics; and providing the selected content items for presentation to the user.

13. The non-transitory computer storage medium of claim 11, further comprising:

ranking the identified known topics based on ranking information associated with each identified known topic; and generating the list of candidate topics based on the ranking.

14. The non-transitory computer storage medium of claim 13, wherein the ranking information associated with an identified known topic describes a level of correlation between the known topic and each package name identifying an application installed on the user devices of the set of existing users.

15. The non-transitory computer storage medium of claim 11, further comprising:

retrieving a user-package name matrix and a user-topic matrix associated with the set of existing users and the plurality of applications installed on the user devices of the set of existing users; and generating the package name-topic matrix by multiplying a transpose of the user-package name matrix with the user-topic matrix.

16. The non-transitory computer storage medium of claim 11, wherein the user-package name matrix is a two-dimensional matrix with one dimension representing the set of the existing users and the other dimension representing the computer applications identified by the plurality of the package names.

17. The non-transitory computer storage medium of claim 14, wherein each entry of the user-package name matrix represents a correlation between a corresponding user and a computer application identified by a corresponding package name, the correlation indicating how relevant the computer application is to the user with respect to other computer applications.

18. The non-transitory computer storage medium of claim 17, wherein the correlation between a corresponding user and an application identified by a corresponding package name is represented by a numeric value generated by a trained term frequency and inverse document frequency statistic model based on user information of the set of existing users and information of the plurality of applications installed on the user devices of the set of existing users.

19. The non-transitory computer storage medium of claim 15, wherein the user-topic matrix is a two-dimensional matrix with one dimension representing the set of the existing users and the other dimension representing the known topics for the set of existing users.

20. The non-transitory computer storage medium of claim 19, wherein each entry of the user-topic matrix represents a correlation between a corresponding user and a corresponding known topic, the correlation indicating how relevant the known topic is to the user with respect to other known topics.

* * * * *

UNITED STATES PATENT AND TRADEMARK OFFICE
CERTIFICATE OF CORRECTION

PATENT NO. : 10,311,070 B2  
APPLICATION NO. : 15/242088  
DATED : June 4, 2019  
INVENTOR(S) : Griesmeyer Page 1 of 1

It is certified that error appears in the above-identified patent and that said Letters Patent is hereby corrected as shown below:

In the Claims

In Column 15, Claim 13, Line 39, delete "storage medium" and insert -- readable storage medium --, therefor.

In Column 15, Claim 14, Line 46, delete "storage medium" and insert -- readable storage medium --, therefor.

In Column 16, Claim 15, Line 4, delete "storage medium" and insert -- readable storage medium --, therefor.

In Column 16, Claim 16, Line 14, delete "storage medium" and insert -- readable storage medium --, therefor.

In Column 16, Claim 17, Line 20, delete "storage medium" and insert -- readable storage medium --, therefor.

In Column 16, Claim 18, Line 28, delete "storage medium" and insert -- readable storage medium --, therefor.

In Column 16, Claim 19, Line 36, delete "storage medium" and insert -- readable storage medium --, therefor.

In Column 16, Claim 20, Line 41, delete "storage medium" and insert -- readable storage medium --, therefor.

Signed and Sealed this  
Twenty-second Day of October, 2019

Andrei Iancu  
*Director of the United States Patent and Trademark Office*